A. MEUCCI.
Method of Testing Milk.
No. 168,273.
Patented Sept. 28, 1875.
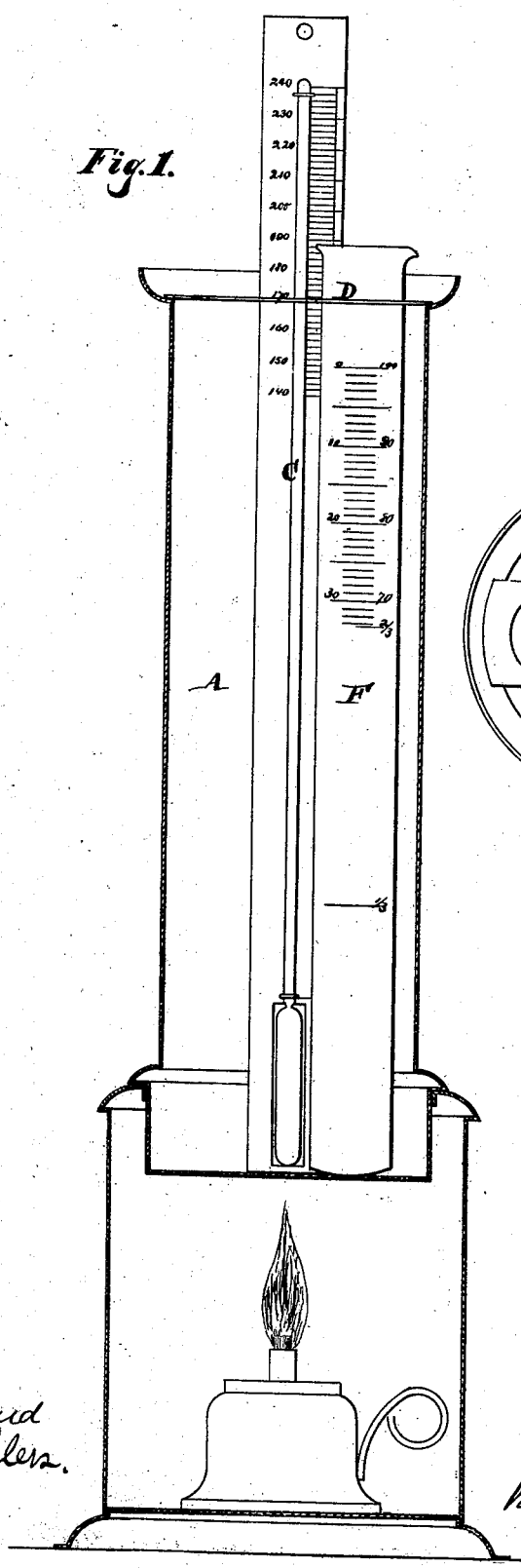
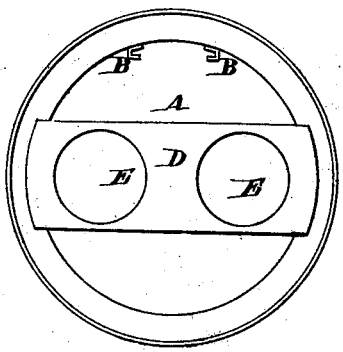

UNITED STATES PATENT OFFICE.

ANTONIO MEUCCI, OF CLIFTON, ASSIGNOR TO GUISEPPE TAGLIABUE, OF EAST CHESTER, NEW YORK.

IMPROVEMENT IN METHODS OF TESTING MILK.

Specification forming part of Letters Patent No. 168,273, dated September 28, 1875; application filed July 23, 1875.

*To all whom it may concern:*

Be it known that I, ANTONIO MEUCCI, of Clifton, in the county of Richmond and State of New York, have invented a new and Improved Method of Testing Milk, which invention is fully set forth in the following specification:

My invention relates to testing milk for the purpose of detecting whether it has been tampered with by the removal of cream, or by diluting with water, or otherwise adulterated.

A common method of testing milk is by the use of the instrument known as the lactometer; but that method, although it has been generally regarded as trustworthy, is not trustworthy, for the reason that it does not distinguish between milk which is exceptionally rich and milk which has been largely watered. For example, if milk is deprived of its cream, in whole or in part, by skimming, and thereby raised in gravity, and again lowered in gravity to the normal standard of the specific gravity of pure milk by the addition of water, the absence of the cream remains undetected by the lactometer.

Another contrivance which has been employed for testing milk is the creamometer— a device of the form of a graduated test-tube— in which the milk is allowed to stand and throw up its cream, the volume of which is afterward read off from the scale on the tube. This instrument does not afford a satisfactory test, because of the well-known variance in the percentage of cream contained in pure milk, and because milk may have less than the average percentage of cream and yet be pure, or it may yield the average percentage of cream, and may nevertheless have been tampered with by diluting it with water.

Pure milk is about eighty-eight per cent. water, and the remaining twelve per cent. consists of substances which are known as "milk-solids," such as caseine, fat, milk-sugar, and small quantities of mineral matters. Its specific gravity is about 1.029—1.033 at the temperature of 60° Fahrenheit. It exhibits great constancy of composition, ordinary variations in the diet of the cow showing themselves in the amount of secretion rather than in its quality. From the observations of Alexander Müller, who carried out an investigation for the Royal Agricultural Society of Sweden, it appears that the milk yielded by a herd of cows remains very constant throughout the year. A daily analysis of milk given by fifteen cows of different breeds, uniformly well fed, exhibited a constant or only slightly-varying composition of milk, the water and the milk-solids being substantially constant. I have had reference to this fact in making my invention, which consists in testing milk by separating the milk-solids from the water, as hereinafter described, so that they can be separately measured, and the amount of each determined.

In carrying out my invention I mix the sample of milk to be tested in a graduated tube, with solutions hereinafter described, and subject the mixture to a temperature a little below the boiling-point of water, and then allow it to cool gradually, when the milk-solids will be collected in the upper part of the tube.

The following are the solutions referred to, which I have employed with satisfactory results:

Solution No. 1 consists of water, 324.8 cubic centimeters, and a solution of caustic soda, of the strength of 20° Baumé, 21 cubic centimeters. Mix well at a temperature of about 70° Fahrenheit.

Solution No. 2 consists of water, 386.65 cubic centimeters; sulphuric acid, at the strength of 66° Baumé, 43.8 cubic centimeters; alcohol, at ninety-three per cent., 43.8 cubic centimeters; acetic acid, at the strength of 5° Baumé, 7.50 cubic centimeters. Mix well at the temperature of 70° Fahrenheit.

In applying my invention I employ suitable apparatus for mixing and holding the milk-sample and the solutions with which the sample is treated, and in this example I employ the apparatus represented in the drawing, in which—

Figure 1 represents a water-bath, in vertical section, having in the lower part a heating-chamber to contain a spirit-lamp or other suitable means for heating the water. Fig. 2 is a top view of the water-bath.

The interior of the water-bath A is provided with guides B B, which hold a thermometer, (Fahrenheit,) C, to indicate the temperature of the water in the bath, and across the top of the bath is a bridge-piece, D, which is provided with openings E, one or more, to receive the test-tube and hold it in a proper position in the bath.

The test-tube F consists of a glass tube marked off into three equal divisions, by measure, the lower division being here designated $\frac{1}{3}$, the next above $\frac{2}{3}$, and the upper one 100. The upper division is marked off into thirty-three equal parts, whose enumeration is from above downward, the upper line or place of beginning, which is here marked 0, being in line with the mark 100.

In the drawing, Fig. 1, the test-tube and the thermometer are shown in their places in the bath, ready for use.

In making a test, according to my invention, I place a sample of the milk to be tested in the test-tube until it fills the tube up to the mark $\frac{1}{3}$. I then pour into the tube an equal quantity of the solution No. 1 until the tube is filled up to the mark $\frac{2}{3}$, and the contents of the test-tube are then shaken so as to mix them well together. After the air-bubbles have disappeared I pour into the tube an equal quantity of the solution No. 2 until the contents of the tube reach the point 100 or 0. The contents of the tube are then slightly shaken, and the water-bath having been first filled with water at a temperature about equal to that of the contents of the test-tube, which I prefer to have about 70° Fahrenheit, the test-tube, with its contents, is placed in the bath, and heat is applied until the temperature of the water-bath reaches about 190° Fahrenheit. When this temperature is reached the spirit-lamp should be withdrawn and the temperature of the bath be allowed to cool down to about 160° or 170° Fahrenheit, after which the tube is withdrawn and placed in water of a temperature of about 70° or 80° Fahrenheit, and allowed to remain therein until the contents of the tube have acquired the same temperature. The test-tube is then removed, and, upon examination, it will be found that the milk-solids, or the greater portion thereof, have become separated from the water, forming a coagulated or milk-like mass in the upper division of the tube, where they can be measured by means of the divisions on the glass, using the descending numbers beginning with 0, on the left side of the scale. The water, excepting the portion absorbed by the coagulum, will occupy the space between the bottom of the coagulum and the mark $\frac{2}{3}$ on the glass. In this manner the comparative amount of water and milk-solids can be ascertained.

It is evident that if milk has been skimmed or tampered with, or diluted with any liquids or liquid, it will yield a decreased amount of milk-solids, and, therefore, the cheat can readily be discovered by my invention.

The amount of milk-solids contained in pure milk is nearly a constant quantity. In pure milk that quantity will indicate about 20 in the test-tube, according to the method, the milk having a specific gravity of about 1.029 at 60° Fahrenheit. If the test-glass indicates a less quantity than 19 the milk has been either skimmed or watered, or both. The range of milk-solids for pure milk may be stated as from 19 to 21. It is important that the operator mix or shake the milk and added solutions well together in using my improved test.

It will be observed that the quantity of water indicated is only the difference between the bottom of the coagulum and the mark $\frac{2}{3}$, which, when the bottom of the coagulum reaches 20, gives only thirteen and one-third divisions for the amount of water; but the coagulum, as collected in the tube, consists largely of water, and if dry it would give a solid mass equal to about three (3) of the divisions, the residue being in fact water absorbed or held by the coagulum. Therefore, the whole amount of water is about twenty-nine or thirty divisions, as compared to three divisions of dry milk-solids, which result will agree substantially with a quantitative analysis of the same milk.

I do not wish to limit myself to the exact quantities or proportions above given of the various materials used in carrying out my invention, nor do I confine myself to the solutions or substances above named for treating milk in order to separate the solids of the milk from the water; but my invention embraces any substances which, for the purpose of my invention, are equivalents to the substances above named, or which will have a similar action on milk, and it embraces such proportions thereof as will produce the result required.

What I claim as new, and desire to secure by Letters Patent, is—

1. The above-described process of testing milk, by mixing the same with any suitable alkaline and acid solutions and subjecting the mixture to heat.

2. The compounds or their equivalents, called in this specification solutions Nos. 1 and 2, substantially as and for the purpose described.

3. The test-tube F, marked off, as described, into three equal divisions, the upper division being being marked off into thirty-three and one-third parts, substantially as described.

In testimony that I claim the foregoing I have hereunto set my hand and seal this 17th day of July, 1875.

ANTONIO MEUCCI. [L. S.]

Witnesses:
J. VAN SANTVOORD,
E. F. KASTENHUBER.